United States Patent [19]

Matsumoto

[11] Patent Number: 4,821,126
[45] Date of Patent: Apr. 11, 1989

[54] MAGNETIC RECORDING METHOD INVOLVING CORE PIECES OF DIFFERENT THICKNESS

[75] Inventor: Takashi Matsumoto, Tokyo, Japan

[73] Assignee: Fuji Photo Film Co., Ltd., Japan

[21] Appl. No.: 922,033

[22] Filed: Oct. 22, 1986

[30] Foreign Application Priority Data

Oct. 22, 1985 [JP] Japan .................................. 60-234621
Mar. 5, 1986 [JP] Japan .................................. 61-46398

[51] Int. Cl.$^4$ .............................................. G11B 5/187
[52] U.S. Cl. ..................................... 360/66; 360/119; 360/118
[58] Field of Search ..................... 360/61, 62, 66, 118, 360/119

[56] References Cited

U.S. PATENT DOCUMENTS

| | | | |
|---|---|---|---|
| 2,468,782 | 5/1949 | Ross et al. | 360/61 |
| 2,987,582 | 6/1961 | Naiman | 360/118 |
| 3,373,249 | 3/1968 | Schager | 360/118 |
| 3,668,332 | 6/1972 | Anderson | 360/118 X |
| 4,405,959 | 9/1983 | Chabrolle | 360/119 |

FOREIGN PATENT DOCUMENTS

EP128625 6/1983 European Pat. Off. ............ 360/119

Primary Examiner—Raymond F. Cardillo
Assistant Examiner—Kevin Fournier
Attorney, Agent, or Firm—Abelman, Frayne, Rezac & Schwab

[57] ABSTRACT

Based on the fact that the recording track width depends on the width of a core at the trailing side relative to the moving direction of magnetic recording medium, narrower track recording and wider track erasing, or a two-mode recording operation either for high-density recording or normal-density recording are realized using a single magnetic head having a narrower core and a wider core opposing to each other through a gap by changing the moving direction of the magnetic recording medium relative to the magnetic head.

7 Claims, 2 Drawing Sheets

MAGNETIC RECORDING METHOD INVOLVING CORE PIECES OF DIFFERENT THICKNESS

BACKGROUND OF THE INVENTION

This invention relates to a magnetic head and a recording/erasing method using the magnetic head, which are usefully applied to electronic still cameras and magnetic recording systems such as magnetic disk recorders for recording photographic images.

An electronic still camera converts an image of a subject to a video signal and records it on a magnetic recording medium such as a floppy disk. For the purpose, the electronic still camera of this kind contains a magnetic head for recording or erasing the video signal on the floppy disk. If a magnetic head for recording and a separate magnetic head for erasing are both contained in the electronic still camera, spaces for the two magnetic heads will be required, which impede designing a compact unit as a portable camera.

To avoid the above disadvantage of using two magnetic heads, there has been proposed a method for using a single magnetic head for both recording and erasing, that is, either a recording current or an erasing current is flown through the coil of a single magnetic head, in order to reduce space.

However, the method using a single magnetic head for recording and erasing has the following new problem.

Since it uses a single magnetic head, the recording track and erasing track have the same widths, but erasing may be made on a different position relative to the recording track, due to deformation or eccentricity of the magnetic recording medium (for floppy disk) or fluctuation in speed (for magnetic tape), resulting in an unerased portion on the track.

The electronic still camera can take normally 50 photos using a field recording method, which uses a floppy disk having 50 annular tracks for recording a signal for one field on each track.

In use of the electronic still cameras, there may be required to increase the recording density, for example, to a double density. To meet such a requirement, the following techniques are generally considered.

(i) The rotation speed of the floppy disk is decreased to a half to shorten the recording wavelengths, thereby increasing the linear recording density. Thus, a track is divided into a first half and a second half, and different field signals are recorded on individual half-tracks. This allows 100 different field signals to be recorded on 50 tracks, thereby providing a double-density recording.

(ii) In addition to the magnetic head having a normal track width, a separate, high-density recording head having a track width of a half that of normal magnetic head is provided. Using the high-density recording magnetic head, 100 tracks are formed to record 100 different field signals, thereby providing a double-density recording.

The conventional art techniques described in (i) and (ii) above have the following problems.

(a) A still video floppy disk has a shortest recording wavelength of 0.5 $\mu$m. When the recording wavelength is decreased using the above technique (i), the recording wavelength is near the lower limit of recording wavelength and stable recording cannot be obtained. Moreover, in view of carrier/noise ratio C/N, the technique (i) using the half recording wavelength results in a 6 dB reduced C/N ratio. The value is determined by the following equation (1).

$$\text{Optimum recording point} \propto \sqrt{\tfrac{1}{2}.no.W.\lambda} \quad (1)$$

where
 $no$: number of magnetic particles per unit volume
 W: track width
 $\lambda$: recording wavelength (b) The technique (ii) is technically realizable, however, it has a disadvantage that an additional high-density magnetic head must be provided, which impedes designing a compact system. When the track width is reduced to a half using the technique (ii), the reduction in C/N radio is only 3 dB, which is advantageous over the technique (i).

SUMMARY OF THE INVENTION

In view of the prior art situation, it is a first object of the present invention to provide a magnetic head which can make recording and erasing with a single magnetic head, with an erasing track width greater than a recording track width, and a recording/erasing method using the magnetic head. A second object of the present invention is to provide a magnetic recording method which can provide recording with either of two recording densities, a normal-density (single-density) recording or a high-density recording, using a single magnetic head.

The present invention which attains the above objects is based on the following findings. It has been found that the recording track width in magnetic recording and the erasing track width in erasing are determined by the width of the edge of the trailing core relative to the moving direction of the magnetic recording medium, from among the cores opposing to each other through the gap of the magnetic head. This is called a "trailing edge effect". With a consideration that both recording and erasing could be performed with a single magnetic head if the magnetic head is used so that a relatively narrower core edge of the magnetic head is at the trailing side relative to the moving direction of the magnetic recording medium in the recording operation, and a relatively wider core edge of the magnetic head is at the trailing side in the erasing operation, with an erasing track width wider than a recording track width utilizing the trailing edge effect, the following experiment was conducted.

FIG. 1 is a schematic view of a magnetic head I used in the experiment, as viewed from the gap side. Referring to FIG. 1, cores 2 and 3 opposing to each other through a gap 1 of the magnetic head I have different edge widths W1 and W2. In this case, W1 was 16 $\mu$m, whereas W2 was 28 $\mu$m.

In the experiment, a magnetic disk was used as the magnetic recording medium, which was rotated forward or reverse, and the same recording current was supplied to the magnetic head I to record magnetization patterns for both cases. FIG. 2 is a microphotograph of the magnetization pattern with a magnification of 400, formed in the above experiment, for the forward rotation of the magnetic disk, in which the narrower core 2 is at the trailing edge side, and FIG. 3 is that for the reverse rotation of the magnetic disk, in which the wider core 3 is at the trailing edge side. As can be seen from FIG. 2 and FIG. 3, magnetization patterns are formed with a track width TW1 of 16 $\mu$m and a track width TW2 of 28 $\mu$m, which are the same as the core widths of 16 μm and 28 μm for the cores 2 and 3, respectively. Thus, it was confirmed that erasing could be made with the erasing track width TW2 wider than the recording track width TW1 when the core 2 was used as the trailing edge for recording, or the core 3 as the trailing edge for erasing.

Based on the above described experimental results, there is provided a magnetic head having a narrower core and a wider core opposing to each other through a gap, which is used so that the moving direction of a magnetic recording medium relative to the magnetic head is from the wider core to the narrower core for recording signals on the magnetic recording medium, or from the narrower core to the wider core for erasing signals on the magnetic recording medium. The magnetic head is also used so that the moving direction of the magnetic recording medium relative to the magnetic head is from the narrower core to the wider core for normal-density recording, or from the wider core to the narrower core for high-density recording.

DESCRIPTION OF THE PREFERRED EMBODIMENTS

A first embodiment of the present invention will now be described in detail with reference to the drawings.

Figure 4:
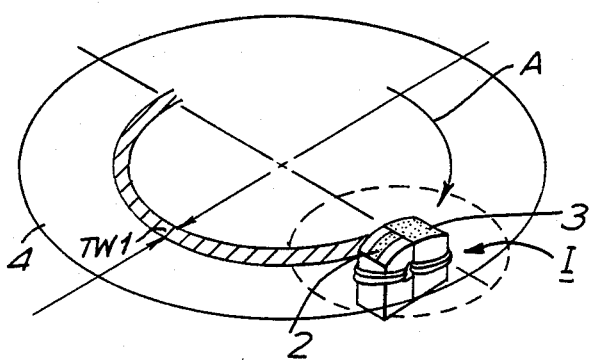
FIG. 4 is a schematic showing the recording operation of the embodiment according to the present invention.
Figure 5:
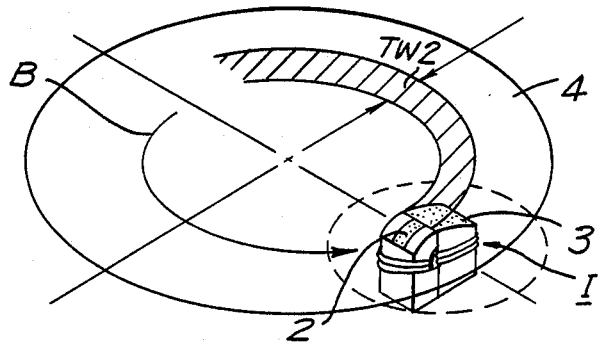
FIG. 5 is a schematic showing the erasing operation of the embodiment according to the present invention.

FIG. 4 and FIG. 5 are schematics showing the recording operation of the present invention, of which FIG. 4 is for recording and FIG. 5 is for erasing. A magnetic head I shown in the figures is the same as that shown in FIG. 1. One core 2 of cores opposing to each other through a gap 1 has a width W1 which is smaller than a width W2 of the other core 3. In the recording operation, a floppy disk 4 is rotated from the core 3 side to the core 2 side, as indicated with an arrow A in FIG. 4. In this case, a recording track width TW1 is equal to the width W1 of the core 2.

In the erasing operation, on the other hand, the floppy disk 4 is rotated from the core 2 side to the core 3 side, as indicated with an arrow B in FIG. 5. Thus, an erasing track width TW2 is equal to the width W2 of the core 3, which enables erasing with the erasing track width TW2 greater than the recording track width TW1. The rotating direction of the floopy disk 4 can be easily reversed by operating a switch to change the rotating direction of a spindle motor.

In this embodiment, the rotation direction of the magnetic recording medium, that is the floppy disk 4, is reversed for recording from that for erasing, while the magnetic head I is fixed. In principle, however, it will serve the purpose if the moving direction of the magnetic recording medium relative to the magnetic head I for recording recording is the reverse of that for erasing. Therefore, the magnetic head I may be turned 180 degrees for recording or erasing, with the moving direction of the magnetic recording medium unchanged.

Figure 6:
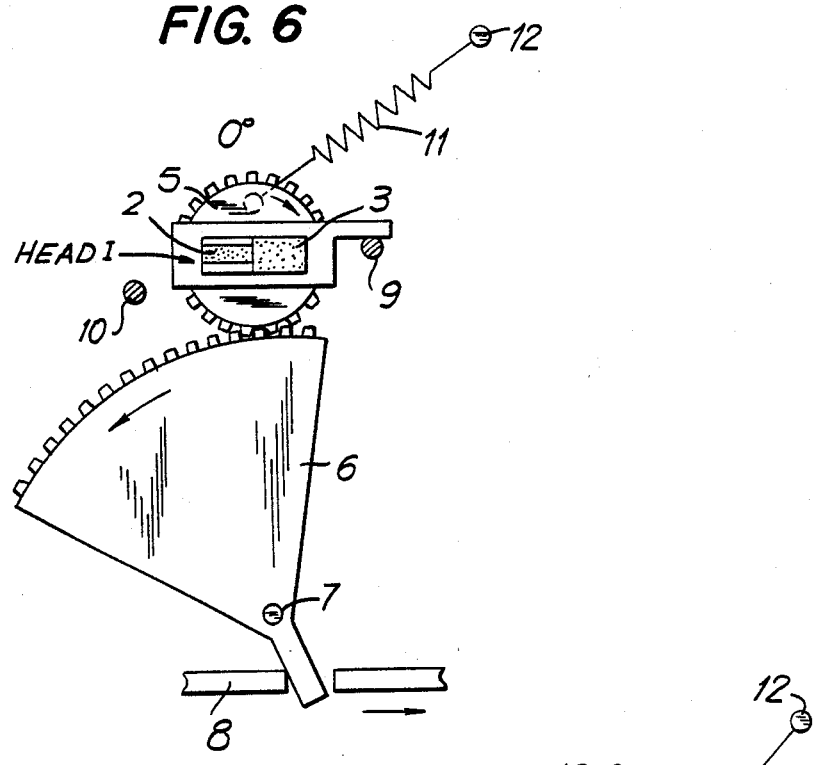
FIG. 6 and FIG. 7 are schematics showing the structure of a turning mechanism for the magnetic head of the embodiment according to the present invention.
Figure 7:
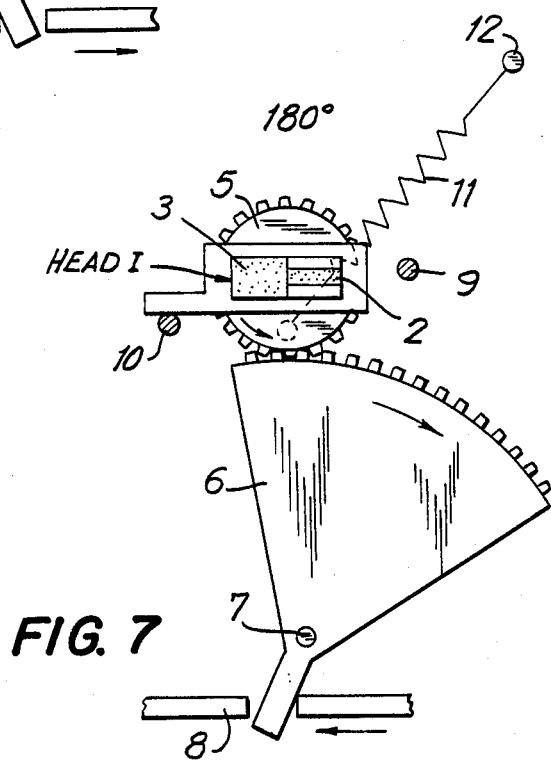

FIG. 6 and FIG. 7 are schematics showing a turning mechanism for the magnetic head I. Referring to the figures, the magnetic head I having the narrower core 2 and the wider core 3 is fixed to a gear 5, and can be turned integrally with the gear 5. A fan-shaped gear 6 with a center fixed to a shaft 7, engaging with the gear 5, can be turned clockwise or counter-clockwise around the shaft 7 by moving a slider 8 to the left or right. Thus, referring to FIG. 6, when the slider 8 is moved to the right in the figure, the gear 5 and in turn the magnetic head I are turned clockwise by the fan-shaped gear 6 which turns counter-clockwise, with the position regulated by a stopper 9. On the other hand, as shown in FIG. 7, when the slider 8 is moved to the left in the figure, the gear 5 and the magnetic head I are turned counter-clockwise by the fan-shaped gear 6 turning clockwise, until the turning is limited by a stopper 10 at a position turned 180 degrees from that shown in FIG. 6.

The gear 5 is always urged by a spring 11 towards a stud 12 holding an end of the spring 11. The spring 11 removes backlash between the gear 5 and the fan-shaped gear 5 to hold the magnetic head I at correct, exact positions.

With an apparatus having the above described turning mechanism for the magnetic head I, the same effect as with the above embodiment can be obtained even with a single moving direction of the magnetic recording. Thus, if the condition shown in FIG. 6 is for recording, and that shown in FIG. 7 is for erasing, the magnetic recording medium can be moved from the right to the left in the figures.

A second embodiment according to the present invention will be described with reference to the drawings.

FIG. 4 and FIG. 5 also schematically show the recording operation of the present invention, for double-density recording and single-density recording, respectively.

Figure 1:
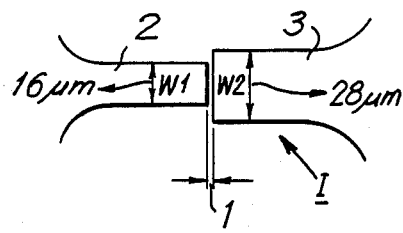
FIG. 1 is a schematic view of a magnetic head of an embodiment according to the present invention.
Figure 2:
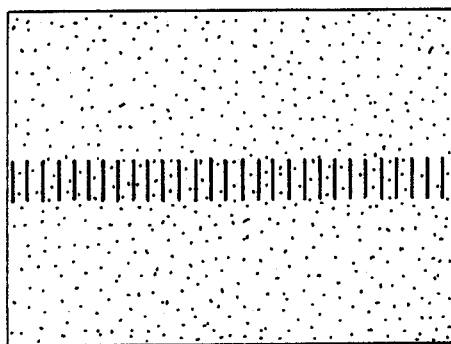
FIG. 2 and FIG. 3 are microphotographs showing magnetization patterns formed on a magnetic recording medium, rotated forward and reverse, respectively, using the magnetic head shown in FIG. 1.
Figure 3:
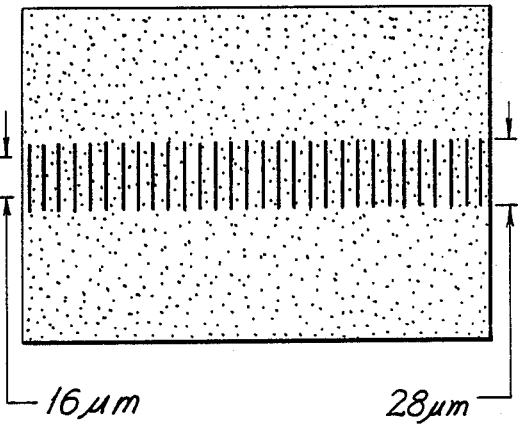

The magnetic head I is the same as that shown in FIG. 1. One core 2 of the cores opposing to each other through a gap 1 has a width W1 which is smaller than a width W2 of the other core 3.

In the double-density recording operation, a floppy disk 4 is rotated from the core 3 side to the core 2 side, as indicated with an arrow A in FIG. 4. In this case, a width TW1 of the double-density recording track is equal to the width W1 of the core 2. In the single-density recording operation, on the other hand, the floppy disk 4 is rotated from the core 2 side to the core 3 side, as indicated with an arrow B in FIG. 5. Thus, a width TW2 of the single-density recording track is equal to the width W2 of the core 3, which enables recording with the single-density recording track width TW2 greater than the double-density recording track width TW1. The rotating direction of the floppy disk 4 can be easily reversed by operating a switch to change the rotating direction of a spindle motor.

In this embodiment, the rotation direction of the magnetic recording medium, that is the floppy disk 4, is reversed in double-density recording from that in single-density recording, while the magnetic head I is fixed. In principle, however, it will serve the purpose if the moving direction of the magnetic recording medium relative to the magnetic head I in double-density recording is the reverse of that in single-density recording. Therefore, the magnetic head I may be turned 180 degrees for recording or erasing, with the moving direction of the magnetic recording medium unchanged.

The turning mechanism for the magnetic head I shown in FIGS. 6 and 7 can also be used in this embodiment.

As described above with the embodiments, the present invention enables either recording or erasing using a single magnetic head to erase with an erasing track width greater than a recording track width, thereby providing positive erasing with no unerased portions remaining on the track.

The present invention also provides stable recording operation either for double-density recording or single-density recording using a single magnetic head.

I claim:

1. A recording/erasing method using a magnetic head having a narrower core and a wider core opposing each other through a gap, wherein a moving direction of a magnetic recording medium relative to said magnetic head is from said wider core to said narrower core of said magnetic head for recording signals on said magnetic recording medium, and a moving direction of said magnetic recording medium relative to said magnetic head is from said narrower core to said wider core of said magnetic head for erasing signals recorded on said magnetic recording medium.

2. A recording/erasing method as claimed in claim 1, wherein said moving direction of said magnetic recording medium is reversed for recording or erasing, with position of said magnetic head unchanged.

3. A recording/erasing method as claimed in claim 1, wherein positions of one and the other cores of said magnetic head relative to said magnetic recording medium are reversed 180 degrees for recording or erasing, with moving direction of said magnetic recording medium unchanged for recording or erasing.

4. A magnetic recording method using a magnetic head having a narrower core and a wider core opposing to each other through a gap, a moving direction of a magnetic recording medium relative to said magnetic head being from said narrower core to said wider core for normal-density recording, and a moving direction of said magnetic recording medium relative to said magnetic head being from said wider core to said narrower core for high-density recording.

5. A magnetic recording method as claimed in claim 4, wherein said moving direction of said magnetic recording medium is reversed for high-density recording or normal-density recording, with position of said magnetic head unchanged.

6. A magnetic recording method as claimed in claim 4, wherein positions of one and the other cores of said magnetic head relative to said magnetic recording medium are reversed 180 degrees for high-density recording or normal-density recording, with moving direction of said magnetic recording medium unchanged for high-density recording or normal-density recording.

7. A moving mechanism for magnetic head comprising a gear fixed and rotatable integrally with a magnetic head having a narrower core and a wider core, a slider disposed movably to right and left on the straight, a fan-shaped gear with a base end rotatably supported on a shaft and a front end having peripherally provided teeth engaging with said gear, said fan-shaped gear being rotatable clockwise and counter-clockwise around said shaft by moving said slider, and stoppers for positioning said magnetic head at positions 180 degrees different from each other.

* * * * *